US009302187B1

(12) United States Patent
Pascal et al.

(10) Patent No.: US 9,302,187 B1
(45) Date of Patent: Apr. 5, 2016

(54) GAME SEQUENCES INITIATED BY SCANNING OF QR CODES

(71) Applicants: Andrew Pascal, Las Vegas, NV (US); David Pascal, San Francisco, CA (US)

(72) Inventors: Andrew Pascal, Las Vegas, NV (US); David Pascal, San Francisco, CA (US)

(73) Assignee: Pascal Ventures, LLC, Las Vegas, NV (US)

( * ) Notice: Subject to any disclaimer, the term of this patent is extended or adjusted under 35 U.S.C. 154(b) by 0 days.

(21) Appl. No.: 14/449,613

(22) Filed: Aug. 1, 2014

Related U.S. Application Data

(63) Continuation of application No. 13/666,138, filed on Nov. 1, 2012, now Pat. No. 8,827,160, which is a continuation-in-part of application No. 13/473,349, filed on May 16, 2012, now Pat. No. 8,794,508.

(60) Provisional application No. 61/486,678, filed on May 16, 2011.

(51) Int. Cl.
| | |
|---|---|
| *G06K 19/00* | (2006.01) |
| *A63F 13/73* | (2014.01) |
| *G06Q 30/02* | (2012.01) |
| *A63F 13/61* | (2014.01) |

(52) U.S. Cl.
CPC ............... *A63F 13/73* (2014.09); *A63F 13/61* (2014.09); *G06Q 30/0267* (2013.01)

(58) Field of Classification Search
USPC .................................. 235/435, 439, 451, 462
See application file for complete search history.

(56) References Cited

U.S. PATENT DOCUMENTS 8,794,508 B1 * 8/2014 Pascal ........................... 235/375
8,827,160 B1 * 9/2014 Pascal et al. ............. 235/462.01

* cited by examiner

*Primary Examiner* — Matthew Mikels
(74) *Attorney, Agent, or Firm* — Muskin & Farmer LLC

(57) ABSTRACT

A method, apparatus, and computer readable storage to implement a game which is initiated by a player scanning a QR code on a portable device. The player's physical location can be determined from QR code, and then potential prizes in the game are determined based on the location of the player. The potential prizes can come in the form of slices on a wheel and the wheel is spun to a random result.

20 Claims, 10 Drawing Sheets

PRIOR ART

GET READY TO SPIN!

GAME OVER!
YOU WIN 2 TICKETS TO CLUB BIG!

GAME SEQUENCES INITIATED BY SCANNING OF QR CODES

CROSS REFERENCE TO RELATED APPLICATIONS

This application is a continuation in part application of U.S. application Ser. No. 13/473,349, filed on May 16, 2012, entitled, "Dynamic Physical Interaction Tracking System and Method" which is incorporated by reference herein in its entirety. Application Ser. No. 13/666,138 and 61/486,678 are incorporated by reference herein in their entireties.

FIELD OF THE INVENTION

1. Field of the Invention

Embodiments of the inventive concept relate to a system, method, and computer readable storage involving the scanning of QR codes posted in public places by users and initiating game sequences based on those QR codes.

2. Description of the Related Art

The use of physical markers, such as QR (Quick Response) codes, provides businesses with a variety of opportunities to promote products, services, events, sales, etc. A QR code is a two-dimensional barcode that can store information. By downloading an appropriate software-based reader, smart phones are able to read QR codes. Thus, smart phones can become easy-to-use and easy-to-carry QR code readers. There are dozens of QR code reader apps available for cell phones, such as QR Droid and Quickmark Barcode Scanner.

SUMMARY OF THE INVENTION

It is an aspect of the present invention to use QR codes in order to initiate game sequences.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
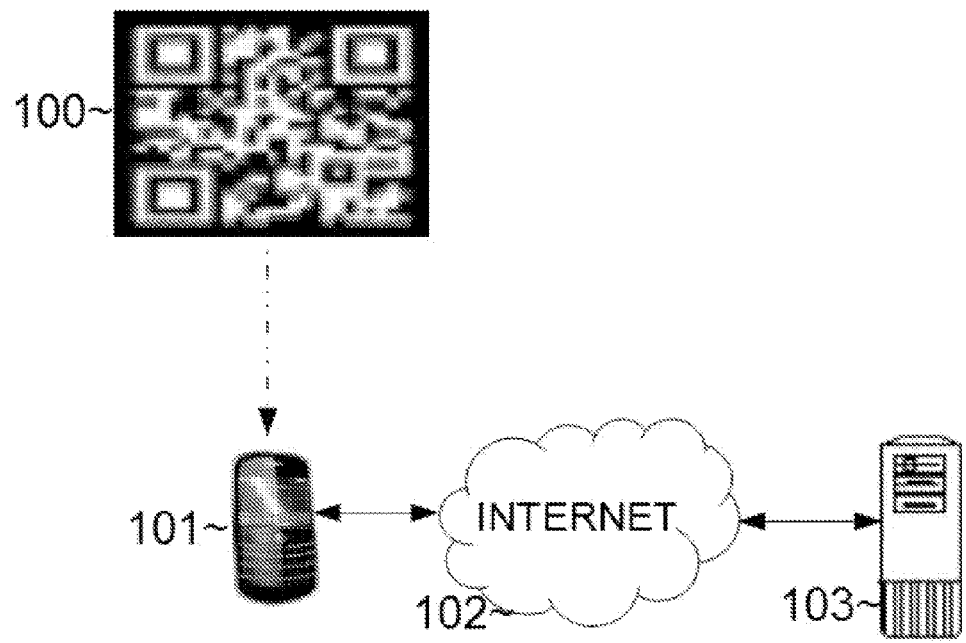
FIG. 1 is a block drawing illustrating the structure of scanning QR codes on a portable device.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

FIG. 1 is a block drawing illustrating the structure of scanning QR codes on a portable device.

A QR code physically exists printed on a substrate (such as paper, cardboard, etc.) A user uses a portable device 101 (such as a cell phone, etc.) and scans the QR code 100. The portable device 101 decodes the QR code and converts it into a link which can be used on the World Wide Web. The portable device 101 is connected to the Internet 102 so that the portable device 101 can visit a web site at the link by requesting the HTML code for the web site from a host 103 hosting the web site. The portable device 101 can then display the web site (using the downloaded html code) directly on the portable device 101.

Embodiments herein can implement a game wherein a player can download a game app which is an application program ("app") to their portable device (e.g., APPLE IPHONE, DROID phone, etc.) that can implement all of the functionality described herein on the portable device (e.g., cell phone, tablet, laptop computer, PDA, etc.). The game app would typically have a QR code reader built in to be able to decode QR codes. QR codes can be scanned by using the portable device's camera to capture the QR code, of which the image is then decoded.

QR codes can be physical placed all around a business establishment (e.g., a casino hotel) which is open to the public. Players (patrons who have downloaded the game app and wish to participate in the game) would scan a QR code (also referred to herein as game QR code) near them and then the game app would launch a game tailored specifically for that location and/or that player. The game can, for example, be a spinning wheel game provides numerous prizes and awards the player a respective prize that the wheels stops spinning at.

Figure 2:
FIG. 2 is a drawing of different display mechanisms for QR codes, according to an embodiment.

FIG. 2 is a drawing of different display mechanisms for QR codes, according to an embodiment.

QR codes that can be scanned by players in order to initiate the game sequence described herein (game QR codes) can be presented to players using different display mechanisms. For example a physical sign 200 can be physical placed (by employees administering the game) at their respective locations. In addition to signs, posters with such QR codes can also be placed on walls.

Another display mechanism for game QR codes can be receipts. When a paper receipt 201 is generated after someone makes a purchase at a retail establishment (e.g., store, restaurant, etc.) the receipt 201 (in addition to having the standard information that a receipt has) can also have a game QR code. When a player scans a game QR code printed on a receipt, the location of that QR would be considered by the system to be at the location of the business where the receipt was generated. Thus, in this embodiment, each game QR code printed on receipts generated at the business location would have the same QR code (and thus the effect would be the same as if a sign has the same QR code located at the business location). In fact, the same QR code can be present both on receipts and at sign(s) at the business location.

In a further embodiment, a game QR code can be printed on a receipt which is a unique QR code which encodes not just the business that generated the receipt but also data about the purchase made. For example, the QR code printed on receipt 201 can also encode purchase data from the receipt itself, which can comprise any combination of the business name, location, products purchased, total purchase price, date, time, etc. In this manner, when the player scans the QR code located at the receipt, the purchase data can be transmitted to the server administering the game and can store the purchase data which is associated with the player. In this way, the system can track and store that the player has made a purchase at Lou's pizza. Thus, for example, in this embodiment, a player would scan the QR code on the receipt. The game would be initiated based on the location of Lou's pizza. The QR code also encodes into the QR code itself the name of the business ("Lou's Pizza") the items purchases ("2 slices cheese pizza"), the total spent ("$2.67"), and the date ("Jan. 4, 2013"). All of this data is transmitted and stored at the server. Either the portable device scanning the code can decode and identify the purchase data and transmit it to the server or just the QR code (either the image or a number/text string representing the decode of the QR code) can be transmitted and the server would decode the purchase data. In addition, the fact that this particular player (who would have registered with the system and thus the server/system knows the identity of each player) has visited a pizza place is stored so the system knows that this player likes fast food (which can be used for the immediate game triggered by the scan of this QR code or for a later game to determine slices for this player). When players continuously scan QR codes on receipts which also encode purchase data, the system would build up a player history of activity this player has conducted (e.g., stores/restaurants visited, items purchases, times visited, dates visited, money spent, etc.), and this activity history can be retrieved at any point in time when any action is taken by the system which customizes itself for particular players.

Figure 3:
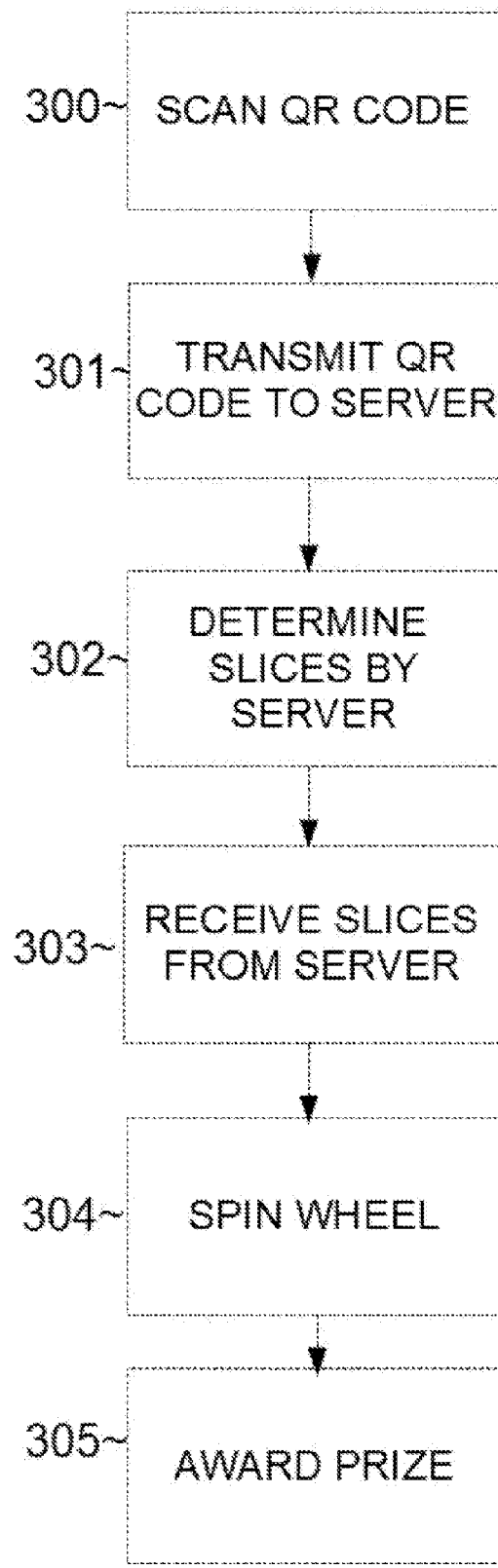
FIG. 3 is a flowchart illustrating a method of initiating a game sequence, according to an embodiment.

FIG. 3 is a flowchart illustrating a method of initiating a game sequence, according to an embodiment.

The method can being with operation 300, in which the player scans a QR code the player sees. Different QR codes would be placed throughout different locations on a property (e.g., a particular casino hotel or group of casino hotels). Typically, each QR code placed around the property is unique. The player would use his portable device to scan a QR code by position the portable device's camera lens to capture the QR code. Typically, the game app embeds its own QR code reader although it can also be present on the mobile device separate.

From operation 300, the method proceeds to operation 301, in which the game app transmits the QR code to a game server that is used to implement the game. It is noted that the portable device can decode the QR code itself, or alternatively, an image of the QR code can be transmitted to the server which itself decodes the QR code. In any case, the server would ultimately have the QR code captured in operation 200 decoded so that the server knows which particular QR the player scanned. The transmission of the QR code to the game server can be effectuated wireless, such as using a cellular data network. All communications between the portable device and outside devices can be performed wireless. The portable device would typically have access to the Internet and can transmit/receive any needed data to/from the Internet using a wireless connection.

The server would have a data structure which identifies all of the QR codes used in the game and their locations among the property where the game is being played. Thus, the server would know where the player is physically located.

In an embodiment, once a QR code is scanned, it will be disabled so that the same player cannot scan the same QR code again. The same QR code can be disabled for a period of time (e.g., a day, a week) or it can be permanently disabled so that a player may only scan a particular QR code once. The server administering the game would store a record associated with each player and the QR codes they have scanned and the time/date they were scanned in order to prevent the same player from re-scanning the QR code during the disabled period. If the player tries to re-scan the same QR code during the disabled period (e.g., same day) then the player would receive a message that he/she is not able to rescan the same bar code (and provide information as to how long the player would have to wait until the player could re-scan that QR code) and the method would not continue to provide the game for the player (the spinning wheel) based on this QR code. Of course, the player is still free to scan other QR codes that are not currently disabled which would then play the game as illustrated in FIG. 3.

From operation 301, the method proceeds to operation 302, in which the server determines slices of the wheel to be used in the game implemented in operation 304. A spinning wheel game will be presented to the player on the player's portable device (see FIGS. 4-6) and the wheel used is comprised of slices. The slices used are determined based upon a combination of factors which can include any combination of the following: the location of the player (determined by the location of the QR code scanned), the time of day the QR code was scanned, the date the QR code was scanned, personal information known about the player, particular items currently being given away (e.g., caps, etc.), and other factors. The determination of the slices used will be discussed below in more detail.

From operation 302, the method proceeds to operation 303, in which the portable device (the game app) receives the slices (e.g., digital images or identifiers of images already present on the portable device) determined (from operation 302) from the server.

From operation 303, the method proceeds to operation 304 in which the game app constructs a wheel (which is customized) from the slices received from the server in operation 303. The wheel then spins (either clockwise or counterclockwise) for a duration of time (e.g., 1-20 seconds or more) and stops at a random outcome (a winning slice out of all of the potential slices). The outcome can be purely random (e.g., if there are 8 slices on the wheel then each slice would have an equal ⅛ chance of winning) or the outcome can be weighted (e.g., some slices would have a higher probability of winning than other slices).

The winning slice (prize) can be determined randomly by the app running on the portable device. The winning slice would be transmitted to the server so that the server can record the prize won by the player. The server would maintain a record of all game activity by each player (e.g., all QR codes scanned and the time/date they were scanned, all prizes won, all prizes redeemed (and the date/time of redemption), etc.) Alternatively, the server can determine the winning slice and the winning slice can be transmitted to the portable device which would spin the wheel and display the winning slice without the player being able to discern that the winning slice was actually determined remotely.

In another embodiment, the winning slice (prize) is not random at all but predetermined by the server. However, the wheel would spin randomly to the player anyway so that the player would not know that the prize was predetermined. The winning prize could be determined based on an analysis of the player's history in the server. For example, players who gives the casino lots of wagering action, for example they have earned greater than a predetermined number of "comp points" (e.g., 1,000). Comp points are awarded by the casino when the players make wagers (e.g., betting $20 on slot machines results in 20 comp points). So players who have earned more than 1,000 comp points (players who have not earned more than 1,000 comp points do not qualify for this) would receive a predetermined prize of a free $25 casino chip in order to entice them to come back to the casino and gamble some more. Other ways such players could be identified is by determining which players have lost more than a predetermined amount of money in the past week (e.g., $1,000), those players who have lost more than the predetermined amount of money would be predetermined to receive the free $25 casino chip slice (while players who have not lost more than the predetermined amount of money would not receive this slice as a predetermined slice). The wheel would still spin and the players would not know that their winning slice was actually predetermined based on the player's history that the server has about them.

As a further example, suppose the server knows that a particular player spends a lot of money at fine restaurants at the property (e.g., the player has spent more than a predetermined amount (e.g., $100) at restaurants on the property.) For players who meet this criteria (players who have not spent more than the predetermined amount do not receive this slice) they would receive a predetermined winning slice of a coupon of $20 (or any other amount) off of an expensive restaurant at the casino in the hopes they will spent a lot more money.

For players who do not qualify to receive any predetermined winning slice, then the winning slice could still be chosen randomly, either out of all of the slices determined to be used (see operation 302) or just out of a set of randomly determined slices. In an embodiment, the result of the wheel spin may be determined randomly although some slices (typically the most expensive prizes) would not be possible to be won (or the chances of winning them would be unlikely in comparison to other slices on the wheel).

From operation 304, the method proceeds to operation 305 which awards any prize won in operation 304. If the outcome is a slice which does not award a prize then the player would not win a prize. Otherwise, the player wins the prize that is associated with the winning slice.

If the player wins a prize, the prize can actually be delivered to the player in numerous ways. For example, the prize can be delivered in the form of a coupon/voucher that appears on the screen of the portable device that can be used to redeem the prize. For example, if the player wins a free slice of pizza at a particular pizza place, then the player can present the coupon for the free slice of pizza to the particular pizza place that can then inspect the coupon and provide the player free slice of pizza. The coupon can also have a barcode on it which can be scanned by the pizza place so the pizza place can confirm the coupon is authentic and deactivate the coupon so that it cannot be used more than once.

Figure 4:
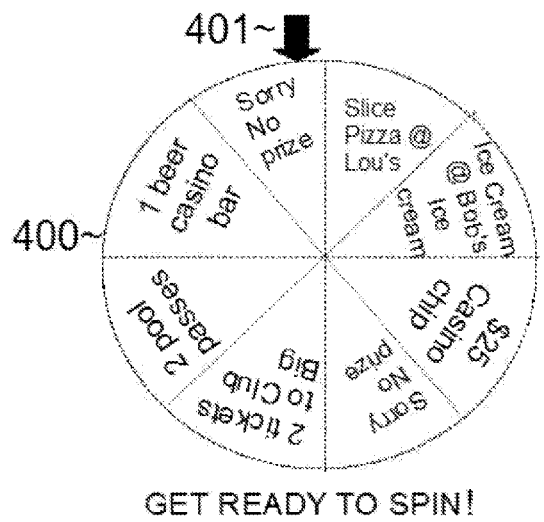
FIG. 4 is a drawing illustrating a game output of a first phase of a game, according to an embodiment.
Figure 5:
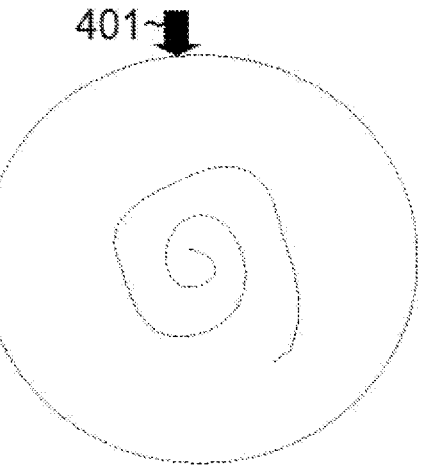
FIG. 5 is a drawing illustrating a game output of a second phase of a game, according to an embodiment.
Figure 6:
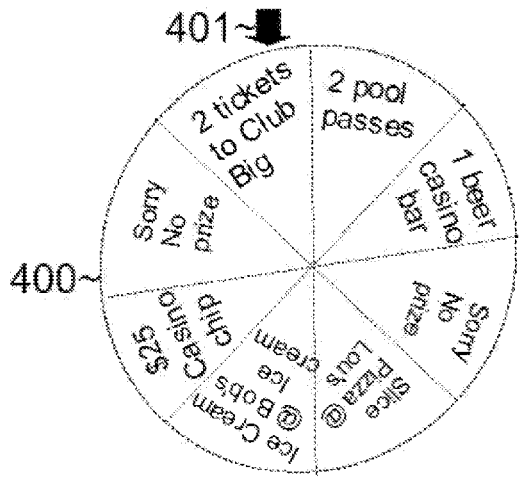
FIG. 6 is a drawing illustrating a game output of a third phase of a game, according to an embodiment.

FIGS. 4-6 illustrate the spinning wheel game in time sequence which would be displayed on the player's portable device and implemented by the game app. This would occur after the player has scanned a game QR code. FIGS. 4-7 would be displayed on the output device of the portable device.

FIG. 4 is a drawing illustrating a game output of a first phase of a game, according to an embodiment.

A wheel (or prize wheel) 400 is displayed with eight slices (although a game can have any number of slices (or prize slices) such as 2 to 20 or more), each slice with a particular prize (or a no-prize). The slices (e.g., the prizes on the slices) are determined on a game by game basis and are customized for the particular player. A static arrow 401 is shown to point to the winning slice after the wheel stops spinning.

Once the wheel is displayed, the wheel can spin automatically (after a predetermined amount of time such as 5 seconds so that the player can inspect the slices) or after the player presses a "spin" button (not pictured) in order to spin the wheel and proceed to FIG. 5.

FIG. 5 is a drawing illustrating a game output of a second phase of a game, according to an embodiment.

After the player has seen the wheel configuration, the wheel spins using computer generated animation for a duration (e.g., 1 to 10 seconds) and will stop on a particular slice.

FIG. 6 is a drawing illustrating a game output of a third phase of a game, according to an embodiment.

After the wheel stops spinning, the slice under the arrow 401 is the winning slice. In this example, the winning slice (prize) is two tickets to "Club Big". The player will then be presented with a coupon/voucher for the free tickets on the portable device.

Figure 7:
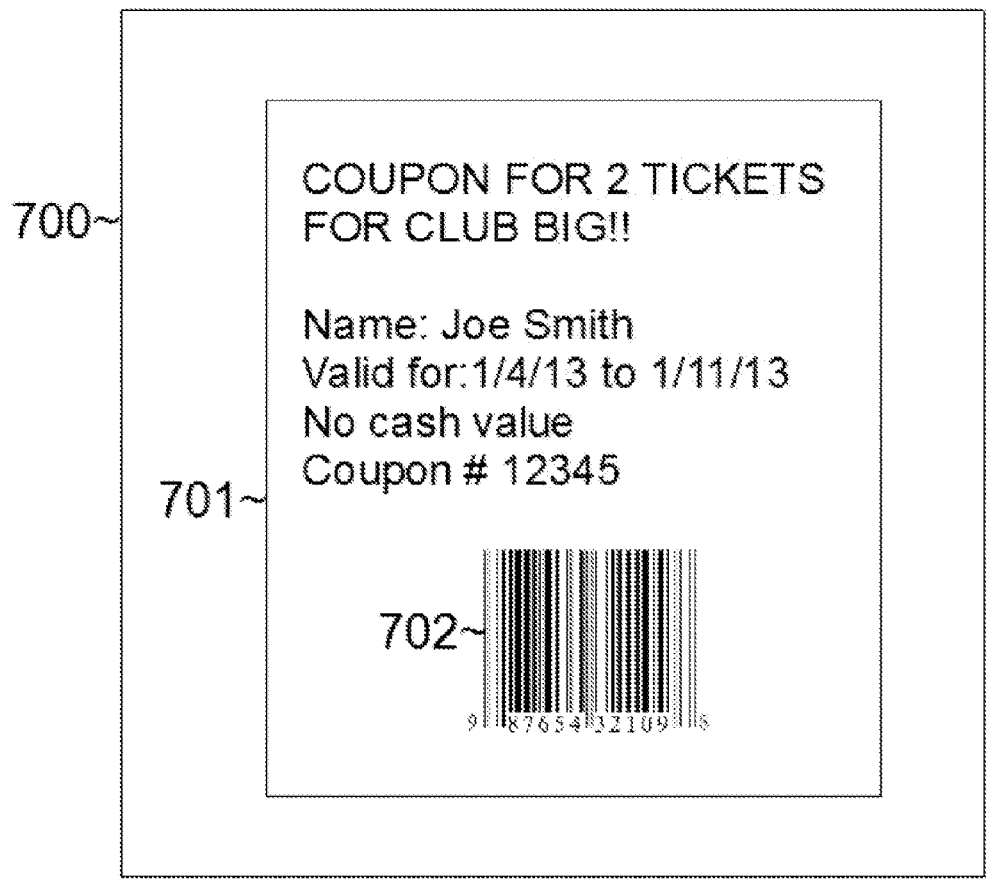
FIG. 7 is a drawing illustrating a sample winning prize coupon, according to an embodiment.

FIG. 7 is a drawing illustrating a sample winning prize coupon, according to an embodiment.

An output device/screen 700 of a portable device shows a digital coupon 701. The coupon describes the prize won and has its own unique barcode 702 (although instead of a barcode a QR code could also be used). The barcode encodes a code which identifies an identification number of the coupon so that its details can be retrieved by the system. The barcode 702 would be scanned by the business where the prize was won (e.g., "Club Big") and the system would verify to the business that the barcode scanned is indeed genuine (was issued and not yet redeemed). Once a coupon is used, the system records (the coupon is identified by its barcode) that it has been redeemed so that the coupon cannot be used again (typically, vouchers are only redeemable once).

Figure 8:
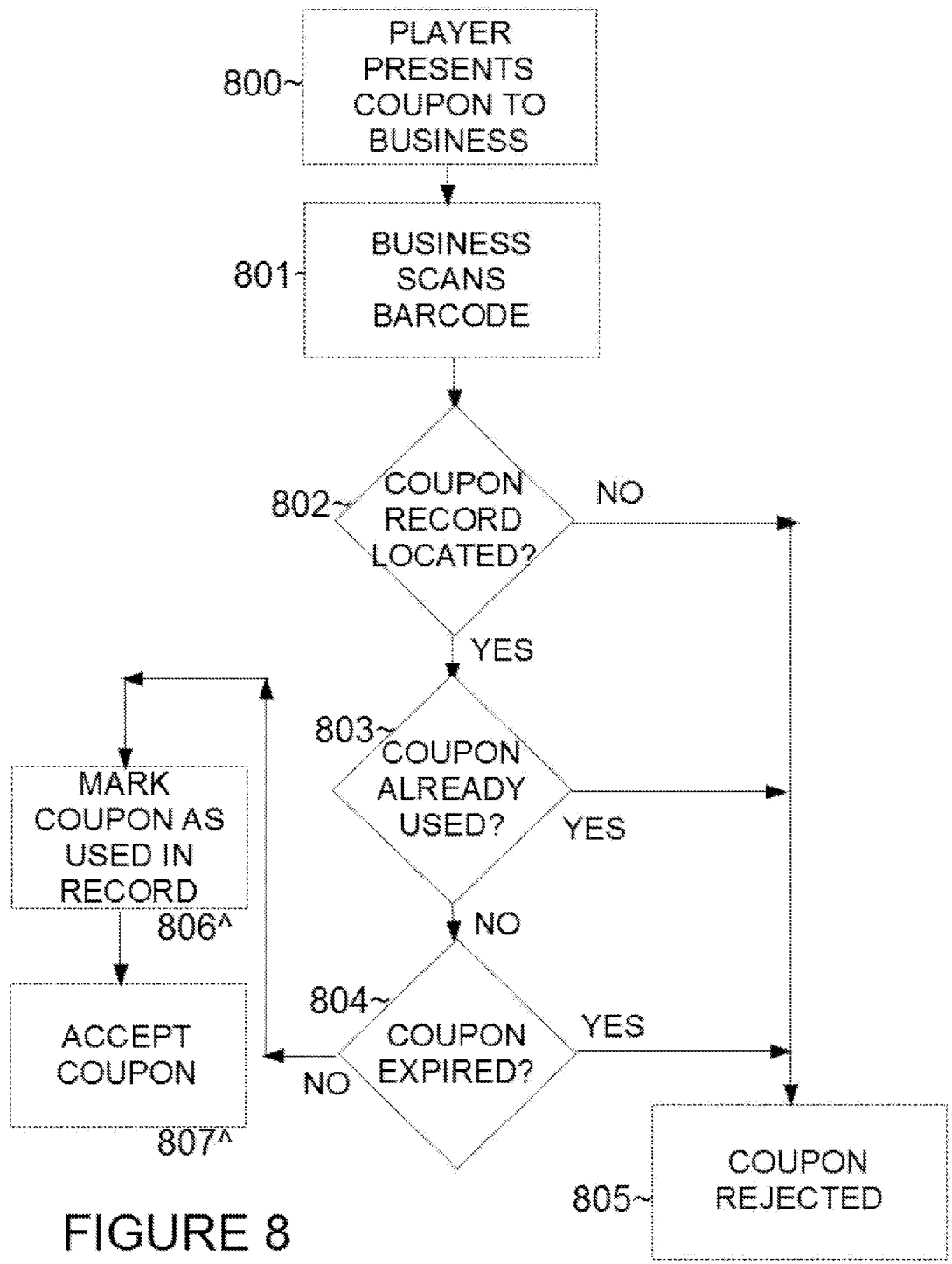
FIG. 8 is a flowchart illustrating an exemplary method of redeeming a prize, according to an embodiment.

FIG. 8 is a flowchart illustrating an exemplary method of redeeming a prize, according to an embodiment. This would be performed in operation 305 from FIG. 3.

In operation 800, the player presents the coupon to the business. This is typically done by the player pulling up the coupon on the player's portable device (by launching the game app and then using the graphical user interface of the game app to display the coupon the player wishes to display). The screen on the portable device is then shown by the player to an employee of the business.

From operation 800, the method proceeds to operation 801, wherein the employee from the business (alternatively the business can have a self-serve scanning kiosk where the player himself/herself scans the barcode) scans the barcode on the screen on the player's portable device using a typical barcode scanner.

From operation 801, the method proceeds to operation 801, wherein the business scans the barcode on the player's screen on the player's portable device. Barcodes can be scanned and read even though they are displayed on an electronic output device (e.g., LCD, OLED, etc.) The scanned barcode is converted into a barcode string.

From operation 801, the method proceeds to operation 802 which then uses the barcode string from operation 801 (representing the barcode) and converts it into a record identifier for the coupon. This can be done in many ways, such as maintaining and accessing a database system (such as a SQL database) in which the barcode string is transmitted and in response the associated record identifier (typically a number or string) is returned. Alternatively, the record identifier can be the barcode string with no conversion required. Then, the database can be queried for the record identifier. If the record identifier cannot be located, then there is something wrong (e.g., the coupon is counterfeit or there has been some malfunction) and the method proceeds to operation 805, wherein the coupon is rejected by the system and hence the business.

If in operation 802, the coupon record is located, then the method proceeds to operation 803 which determines if the coupon has already been used. Each coupon would have a coupon record in the database which has fields for the coupon such as the prize won, date/time won, player name who won it, whether the coupon has been redeemed (used), expiration dates, etc. The database can be queried to determine whether the coupon has already been used before. If so, then the method proceeds to operation 805 which rejects the coupon.

If in operation 803 it has been determined that the coupon has not already been used, then the method proceeds to operation 804 which determines whether the coupon has expired. This can be determined by retrieving the expiration dates field in the coupon record in order to determine if the current time/date falls within the validity period of the coupon (the coupon is not expired). If the current time/date falls outside the validity period of the coupon then the coupon is expired. If the coupon is expired then the method proceeds to operation 805 which rejects the coupon.

In operation 805, the business is presented with an electronic message on the computer being used to scan the coupon (in operation 801) that the coupon is not valid.

If in operation 804, it is determined that the coupon has not expired, then the method proceeds to operation 806, which updates the "used" field in the coupon record to reflect that the coupon has now been used (redeemed) so that the coupon cannot be used at a later time.

From operation 806, the method proceeds to operation 807, which accepts the coupon by the business and the business provides the goods and/or services that are the subject of the coupon. For example, in the example illustrated in FIGS. 4-7, the player now can have two people (the player and a guest) enter the "Club Big" nightclub without having to pay.

In one embodiment, players of the game do not need to register with the system and can play simply by downloading an application (e.g., at the "APP STORE" or "ANDROID MARKET"). In another embodiment, in order to play the game, players would need to register with the server (the game server which administers the entire game). The registration can be done either by visiting a game web site which is configured to implement the registration process, or alternatively the registration can be done through the app itself that the player has downloaded on their portable device.

Figure 9:
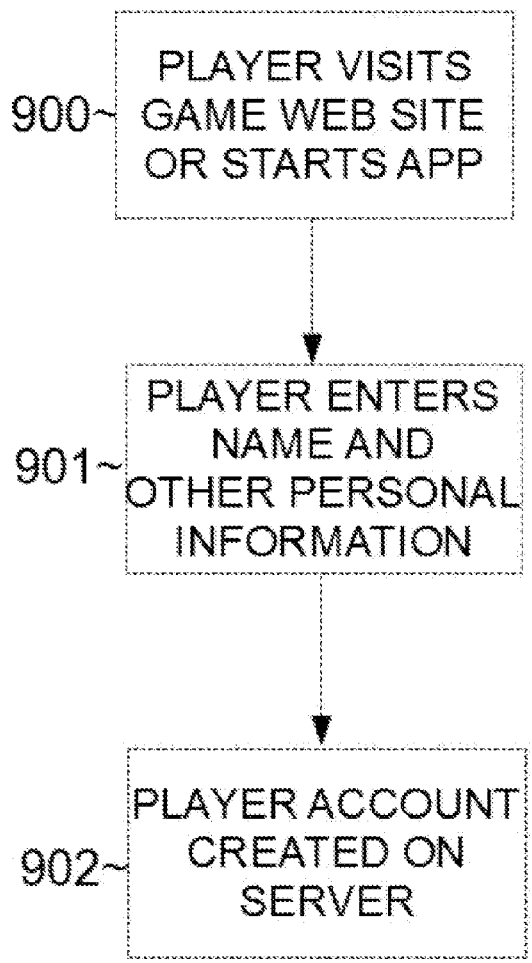
FIG. 9 is a flowchart illustrating an exemplary method of registering for a game account, according to an embodiment.

FIG. 9 is a flowchart illustrating an exemplary method of registering for a game account, according to an embodiment.

In operation 900, the player either visits a game web site which would implement the registration process or initiate the game app that was downloaded by the player which can implement the registration process for a new player. This information is all references later by the system when such information is needed (e.g., if the system needs to know the sex of the player when determining slices, etc.)

From operation 900, the method proceeds to operation 901, wherein the player is prompted for information and responds with the respective information. For example, the information can be any combination of the player name, birth date, address, username, password, email address, phone number, sex, etc.

From operation 901, the method proceeds to operation 902, which creates a player account in the server (the server also includes any database used by the system) which stores all of the information entered by the player in operation 901.

Associated with the player account is the player history which stores all of the activity in the game (all QR codes scanned, their dates/times, all coupons received, all coupons redeemed (and their dates/times of redemption), and any other game information). The account could also be linked to different accounts that a property (hotel chain) may have about the player (e.g., the player's loyalty account) which may contain additional information about the player (e.g., his wagering history, restaurants attended, etc.) Each time a QR code is scanned the server then knows that the player has been at that particular location. For example, if a QR code is located inside a steak house and has been scanned by the player then the system knows (and permanently stores) that the particular player has visited that steak house, which can help in determining the slices used in the wheel (e.g., if the player likes steak houses and a slice can be included at another steak house or another fine dining restaurant).

Figure 10:
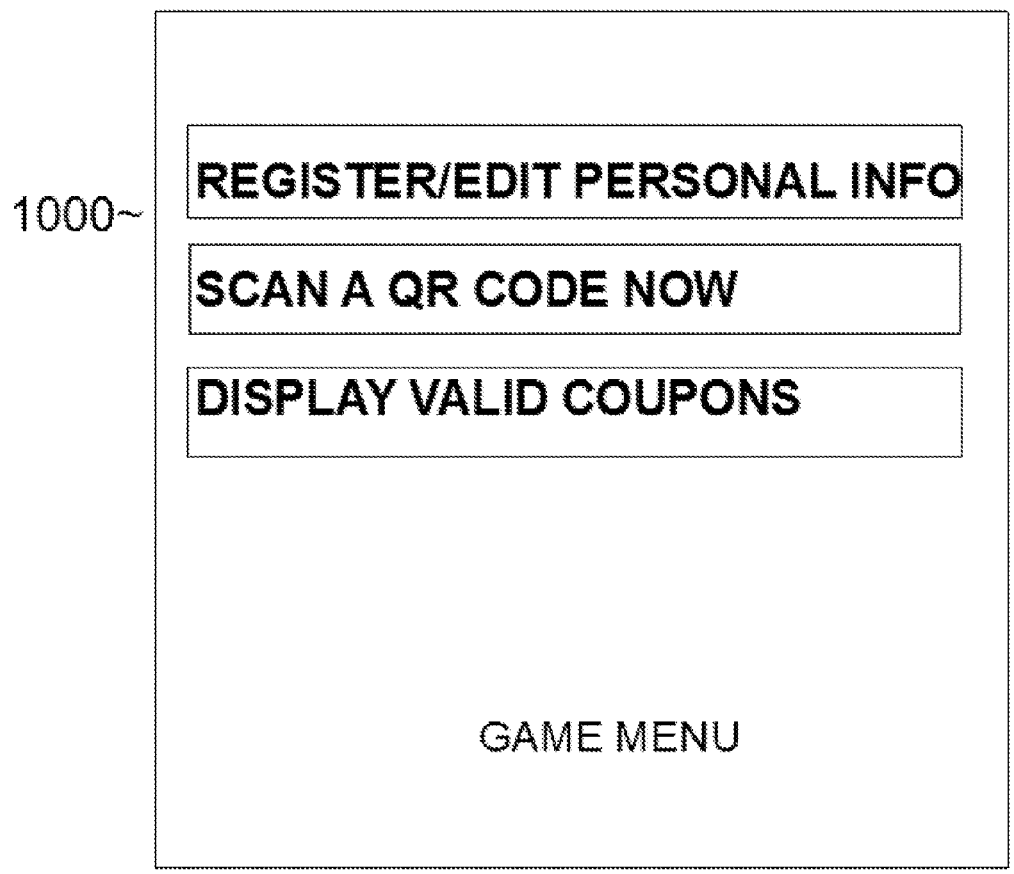
FIG. 10 is a drawing of a game menu, according to an embodiment.

FIG. 10 is a drawing of a game menu, according to an embodiment.

The game app is an app that would run on a smartphone. The game app would use a graphical user interface to allow the player to select and execute various game functions.

A menu screen 1000 would be displayed on the smartphone screen to allow the player to select (using buttons or a touch-screen) a selected function. A "register/edit personal info" option allows the player to register or (if the player has already registered) edit the information he/she has already entered (e.g., change their settings, address, etc.) A "scan a QR code now" option allows the player to actually scan a QR code. A "display valid coupons" option would display the valid coupons the player has earned from previous games (if there are more than one then the player can scroll through all of them). When a coupon expires or is used then it can automatically be removed from the list of valid coupons. Of course there can be other options that are not illustrated in FIG. 10 as well.

Figure 11:
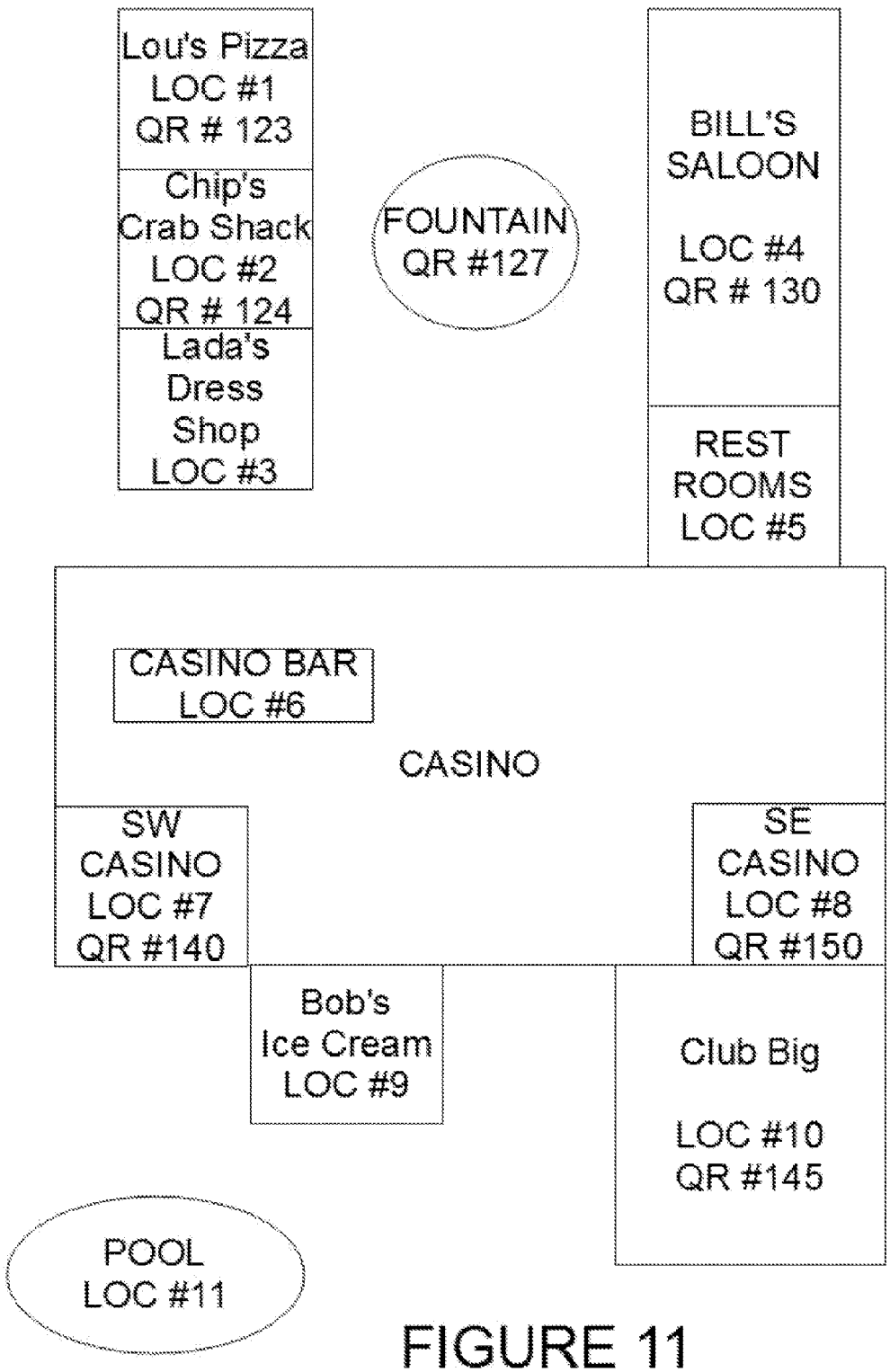
FIG. 11 is a drawing of a map of a property and locations of QR codes, according to an embodiment.

FIG. 11 is a drawing of a map of a property and locations of QR codes, according to an embodiment.

A property that is hosting the game can create a map of physical locations, respective location numbers, and respective QR code numbers at locations that have QR codes. Each location on the property would be given a unique location number that typically would not change. Not all locations are required to display a QR code. For those locations that do currently display a QR code (e.g., on a sign, poster or on a receipt generated at that location) then the map shows a QR number also at that location. The QR number is the string returned when that QR is scanned, or alternatively is some function of the string (e.g., a hash, etc.) For example, on the map, "Lou's Pizza" is identified as location #1 and displays a QR code with a number of 123. "Bob's Ice Cream" is identified as location #9 but does not display a QR code. Locations that do not have a QR code number on the map mean that there is no QR code displayed at that location.

Physical coordinates of each location can be stored. The coordinates can be longitude/latitude coordinates (e.g., from a GPS) or any type of 2 or 3 dimensional coordinate system in which the location of each location (e.g., the center of each location) can be stored. A relative distance system can also be used which stores the relative distances between two locations on the map. Distances can be measured in absolute feet (e.g., "as the crow flies" or feet that would have to be walked by customers, or time it would take for a customer to walk the distance between two locations). Table I below illustrates a sample relative distance table which is measure in walking distance (in feet) between two locations.

TABLE I

| Location | Location | | | | | | | | | | |
|---|---|---|---|---|---|---|---|---|---|---|---|
| | 1 | 2 | 3 | 4 | 5 | 6 | 7 | 8 | 9 | 10 | 11 |
| 1 | 0 | 15 | 30 | 20 | 40 | 60 | 90 | 125 | 150 | 180 | 200 |
| 2 | 15 | 0 | 15 | 19 | 65 | 45 | 75 | 123 | 135 | 170 | 185 |
| 3 | 30 | 15 | 0 | 22 | 60 | 15 | 30 | 113 | 37 | 155 | 170 |
| 4 | 20 | 19 | 22 | 0 | 15 | 40 | 105 | 110 | 109 | 130 | 210 |
| 5 | 40 | 65 | 60 | 15 | 0 | 30 | 95 | 95 | 100 | 140 | 190 |
| 6 | 60 | 45 | 14 | 40 | 30 | 0 | 20 | 50 | 35 | 135 | 155 |
| 7 | 90 | 75 | 30 | 105 | 95 | 20 | 0 | 60 | 20 | 90 | 170 |
| 8 | 125 | 123 | 113 | 110 | 95 | 50 | 60 | 0 | 35 | 45 | 140 |
| 9 | 150 | 135 | 37 | 109 | 100 | 35 | 20 | 35 | 0 | 45 | 110 |
| 10 | 180 | 170 | 155 | 130 | 140 | 135 | 90 | 45 | 45 | 0 | 115 |
| 11 | 200 | 185 | 170 | 210 | 190 | 155 | 170 | 140 | 110 | 115 | 0 |

For example, the walking distance from the casino bar (location #6) to the pool (location #11) would be 155 feet. If locations are located on different floors, then the walking distance would include the distance to the respective elevator to get to the destination from the origin.

The distance between locations can be used to determine some or all of the slices used on the prize wheel. If the player is at a particular location then slices can be used which are near in distance/proximity to the player so that player would be more inclined to redeem those prizes (if won). The current location is presumed to be the location of the QR code that the player has just scanned. For example, if the player scans QR code #127 (the fountain) then the nearest locations to the fountain are location #1 (Lou's Pizza), location #2 (Chip's Crab Shack), location #3 (Lada's Dress Shop), location #4 (Bill's Saloon) and location #5 (restrooms). Thus, slices can be chosen which can include one or more of locations 1, 2, 3 and 4. Location 5 (the rest room) is not included because there is currently no prize that is offered at this location. Not all locations may have prizes associated with them, for example location #3 (Lada's Dress Shop) may not participate in the game, thus slices would be chosen from locations 1, 2 and 4.

Slices can also be chosen based on the time of day. For example, certain times of the day would have activities associated with them while others would not. For example, from 9 pm to 2 am on a Friday night, the "Club Big" nightclub would be open and thus free tickets to this nightclub can be offered as a slice (while during times outside this range tickets to this nightclub would not be offered as a slice).

Slices can also be chosen based upon personal history known about the player. For example, the server would maintain a detailed history of activities performed by the player. For example, each time the player uses his/her player's card, the activity is recorded in the system. For example, each time the player goes to a restaurant or store and charges the bill to the player's room or uses the player's card for a discount or uses any mechanism so that the system would know the player's identity, then the transaction information (items purchases, time, date, purchase amount, etc.) would be stored in the player's account. Thus, for example, if it is known in the system that the player is male and has previously made a purchase of expensive suits, then a slice can be chosen from a comparable category (e.g., a fancy men's clothing store) with an offer for that store (e.g., $10 of "Fancy Shmancy Men's Store"). If the system knows that the player likes to drink alcoholic beverages than a slice can be chosen that offers alcoholic beverages (e.g., a slice chosen out of two possible free drink slices—a) "free beer at casino bar", or b) "$1 cocktail at Club Big"). If the player scans a QR code at a particular location (e.g., a dance club where the QR code is only visible once inside the club), then the system knows that the player has attended a club and thus a slice can be chosen which has an offer for a club (either the same club the player attended or a different one). In this manner, "intelligent" slices can be selected and presented to the player on the wheel that the player would be likely to like.

Slices can also be chosen based on current promotions being offered by the property. For example, a casino may have 10,000 free caps they wish to give away. As long as supplies last, a "free cap" slice can be used on all games offered by the property.

Slices can be chosen based on a combination of the techniques used to determine slices. For example, if eight slices are used, then two slices can always be blank (no prize), two slices can be determined by using available slices from the two closes businesses in distance to the player, two slices can be determined based on the player's history in the system, and two slices can be determined purely at random from all of the available slices.

A bank of all potential slices is maintained and the actual slices used in a game are all selected from the bank of potential slices. A system administrator can add and delete slices from the bank at will. Each slice added would be given its own characteristics, such as the location it can be redeemed at, type of goods, any expiration period, etc. In this way, when operation 302 is being performed, the most compatible slices out of all of the slices in the bank can be selected to be used as the slices that form the wheel.

The server can maintain a table of all available slices (the slice bank), such as illustrated in Table II. Each available slice has its own identification number.

TABLE II

| Slice # | Slice name | business | category | sex |
|---|---|---|---|---|
| 1 | 1 beer casino bar | casino | alcohol, gambling | m/f |
| 2 | slice pizza @ Lou's | Lou's | fast food | m/f |
| 3 | ice cream @ Bob's | Bob's | fast food | m/f |
| 4 | $25 casino chip | casino | gambling | m/f |
| 5 | 2 tickets to Club Big | nightclub | nightlife | m/f |
| 6 | 2 pool passes | pool | leisure activities | m/f |
| 7 | free night stay | hotel | leisure activities | m/f |
| 8 | $20 off Sal's Steak | Sal's | fine dining | m/f |
| 9 | 10% off Diva's Diamonds | Diva's | jewelry | f |
| . | | | | |
| . | | | | |

There can be a large number of available slices in the slice bank (e.g., 20 to 100 or more) and each time the game is initiated the most appropriate slices (e.g., best matches) can be selected out of all of the available slices for the wheel.

Thus, slices can be chosen based on compatibility with the player. If the player's history (in any database available to the system) shows that the player eats at fine restaurants in the past, then slice #8 would be chosen to provide the player the potential to win the $20 discount at Sal's Steak house.

Note that other information about the player can be used in determining the slices. For example, the player's sex can also be used. Some slices may be applicable to both sexes while some slices may be applicable to only males or females. For example slice #9 in Table II provides a discount to a jewelry shop which is more likely to appeal to females than males. Thus, this slice would be presented only to female players but not male players.

In another embodiment, downloading an app isn't required as the game QR codes can simply be scanned using any standard QR code reader. The QR code reader would then launch a URL associated with the QR code which then initiates the game and awards prizes using the methods described herein. However, this embodiment is less preferable because without a dedicated application the system may have less data about the player.

Figure 12A:
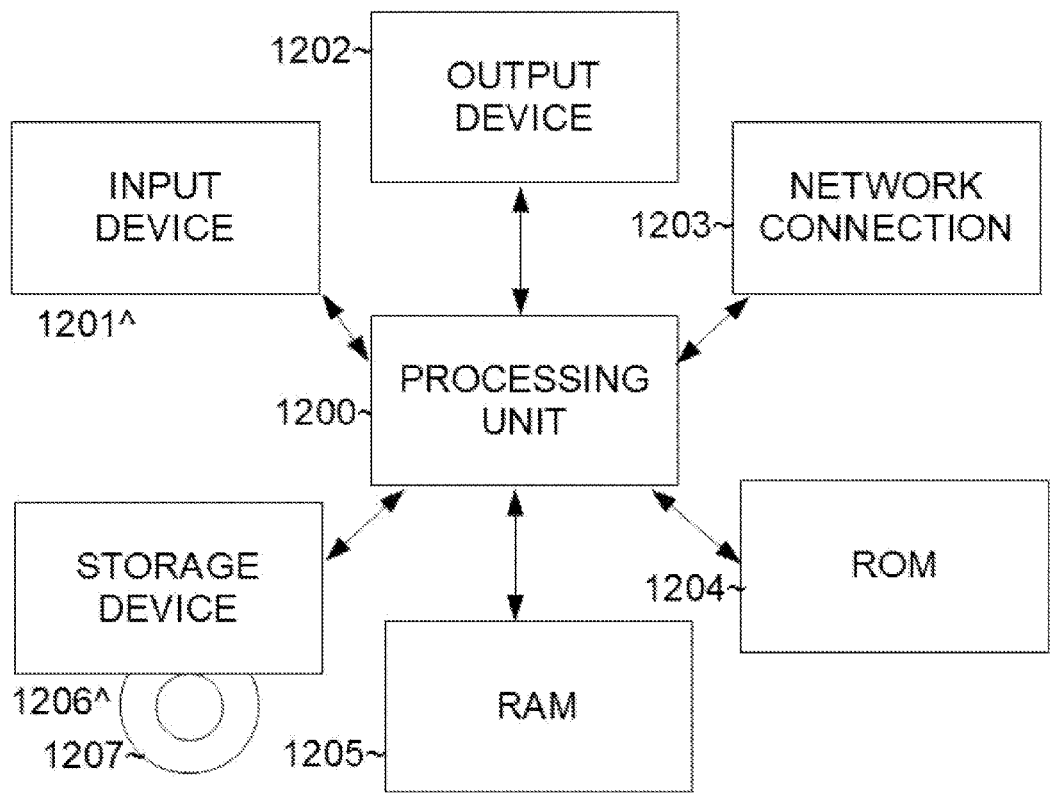
FIG. 12A is a block diagram illustrating exemplary hardware that can be used to implement all of the methods described herein, according to an embodiment.

FIG. 12A is a block diagram illustrating exemplary hardware that can be used to implement all of the methods described herein, according to an embodiment. The hardware in FIG. 12A can be used to implement any computer, server, portable device, smartphone, etc. used in the system/method.

A processing unit 1200 can be a microprocessor and associated structure (e.g., bus, cache, clock, etc.) which can be connected to an input device (e.g., touch-screen, keyboard, mouse, buttons, etc.) which is used to input any information from the player, and an output device (e.g., touch-screen, CRT, monitor, etc.) which displays any information presented to the player. The processing unit can execute instructions which implement any of the methods/features described herein. The processing unit 1200 can also be connected to a network connection 1203 which can connect to a computer communications network such as the Internet, Wi-Fi, LAN, WAN, cellular network, etc. The processing unit 1200 can also be connected to a ROM 1204 and a RAM 1205 as used in the art. The processing unit 1200 can also be connected to a storage device 1206 which can be nonvolatile storage device (e.g., BLU-RAY drive, CD-ROM drive, hard drive, flash memory, EPROM, etc.) A computer readable medium 1207 (e.g., BLU-RAY disc, CD-ROM, hard disc, etc.) can be read by the storage device 1206 and can store programs and assets that can cause the processing unit 1200 to perform any and all of the methods described herein. The ROM and RAM can also be loaded with instructions that can cause the processing unit 1200 to perform any and all of the methods described herein.

The methods described herein can also be interfaced with a web server in order for users/players or system administrators to log into the system and check respective information. For example, players can login into the system using a web browser (either on their cell phone or home computer) using the Internet and check their history in the game (e.g., see how many QR codes they have currently scanned). They can also share this information on a social networking web site such as FACEBOOK by simply pressing a "share" button.

Figure 12B:
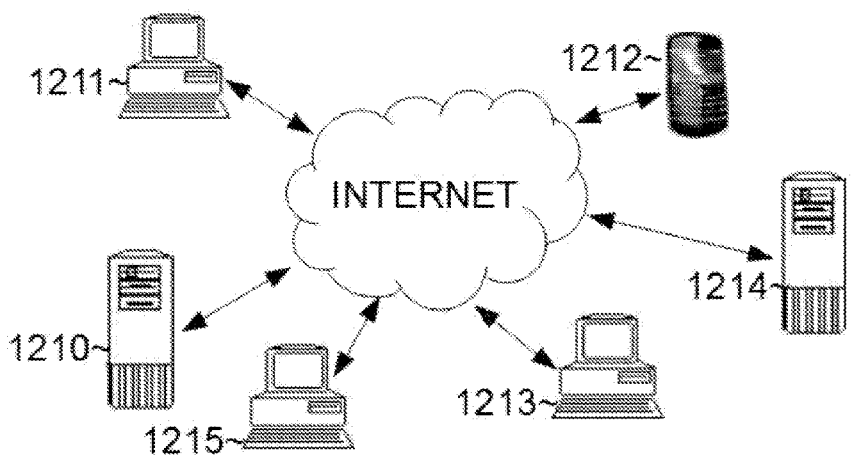
FIG. 12B is a network diagram showing access using the Internet, according to an embodiment.

FIG. 12B is a network diagram showing access using the Internet, according to an embodiment.

A computer communications network (such as the Internet) can be used to connect a web server 1210 which can host and serve a web site which can connect (directly or indirectly) to the game server 1214 (which administers the entire game, wherever 'server' appears herein it refers to the game server 1214). Game server 1214 are shown herein as one server but can actually encompass numbers computers and systems across different physical locations that are all in communication with each other in order to perform all of the methods/operations described herein. The web server 1210 can provide game information to players 1211, 1213 who log into their accounts, such as the locations of the QR codes they have currently scanned and the prizes they have won. The web server 1210 can get the information it transmits to the players from the game server 1214. Information from game server 1214 can be accessed directly from the Internet or indirectly through the web server 1210 which provides a web-enabled access system.

A system administrator 1215 can log into the web site hosted by the web server 1210 in order to access and configure the system and the game server 1214. The system administrator can perform tasks such as identifying the locations new QR codes that have been placed, identifying prizes, awards, incentives, and coupons, for various actions.

Note that while FIG. 12B shows only one server as the web server 1210 and game server 1214, these servers 1210, 1214 can encompass numerous servers all cooperating with each other (whether in the same physical location or not). The web server 1210 communicates with players 1211, 1213 through the Internet (or other computer communication network) and can access and provide information to the players upon request. Game server 1214 can also implement all methods described herein by executing computer code programmed accordingly. The web server 1210 is connected to the Internet and can communicate with all of the players 1211, 1213 (of course many other players can be accommodated which are not pictured) and can offer a bridge to the information stored in game server 1214. All of the communications described in this document can be effectuated using any network configuration.

While the game offered herein is a wheel spinning game with the potential prizes being used as slices in the wheel, it can be appreciated that other games can utilize the same methods herein. Thus, any other game can determine the potential prizes in the same manner as described herein and the outcome of such game would determine which of the potential prizes would be awarded. For example, a dart board can be displayed with the potential prizes (the slices) being displayed not as slices in a wheel but as targets on the dart board, and a projectile (e.g., a dart) would fly and hit a potential prize which would be awarded.

All components herein can be distributed across different such components as needed. For example, a single server as mentioned herein can be distributed across numerous different servers and locations. A processor (or processing unit) can also be distributed across multiple processors in a same or different computer (at a same or different location). The electronic components described herein represent an abstraction but it can be appreciated that the computer systems implementing the methods herein can be more numerous and interconnected than illustrated herein. All determinations, computations, and processes described in this document can be made electronically based on computer algorithms which are specifically programmed for the purposes described. All parts of the system described herein that serve any function have a communications link (of any kind) with all other parts of the system that it needs to communicate with to perform its function.

Any description of a component or embodiment herein also includes hardware, software, and configurations which already exist in the prior art and may be necessary to the operation of such component(s) or embodiment(s). All variables and values described herein can take on any numerical value, including zero or values greater than zero.

Furthermore, the operations described herein can be performed in any sensible order. Any operations not required for proper operation can be optional. Further, all methods described herein can also be stored on a computer readable storage to control a computer. All features described herein (including all documents incorporated by reference) can be combined with one another without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method to provide a game, the method comprising:
   executing on a processing unit instructions to perform:
   scanning a code on a portable device;
   determining a location based on the code;
   determining a plurality of sections, each section comprising a prize, at least one of the sections determined using the code;
   forming and displaying a shape comprising the plurality of sections;
   determining a winning section on the shape; and
   awarding a prize associated with the winning section.

2. The method as recited in claim 1, wherein the at least one of the sections is determined based on a proximity to the code.

3. The method as recited in claim 1, wherein the at least one of the sections is determined based on an activity history of a player who owns the portable device.

4. The method as recited in claim 1, wherein the awarding a prize comprises displaying a coupon on the portable device.

5. The method as recited in claim 4, wherein the coupon comprises a barcode or QR code, the coupon offers a free or discounted product or service at a particular location, and the barcode or QR code is scanned at the location to verify the coupon's authenticity.

6. The method as recited in claim 1, further comprising storing at a server that the code was scanned so that the code cannot initiate another determining a winning section for a period of time.

7. The method as recited in claim 6, wherein the period of time is a day.

8. The method as recited in claim 6, wherein the period of time does not expire so that the code cannot ever initiate another wheel spin.

9. The method as recited in claim 1, wherein the winning section is determined randomly by the portable device.

10. The method as recited in claim 1, wherein the winning section is determined by a remote server and is displayed by the portable device.

11. The method as recited in claim 1, wherein the winning section is not determined randomly but is predetermined by a remote server.

12. An apparatus to implement a game, the apparatus comprising:
   a server connected to a computer communications network and configured to:
   receive a code from a portable device;
   determine a location based on the code;
   determine a plurality of sections, each section comprising a prize, at least one of the sections determined using the code;
   transmit the plurality of section to the portable device to enable the portable device to display a shape comprising the plurality of sections; and
   store a winning section, after the winning section is determined, on the portable device.

13. The apparatus as recited in claim 12, wherein the server is further configured such that at least one of the sections is determined based on a proximity to the code.

14. The apparatus as recited in claim 12, wherein the server is further configured such that at least one of the sections is determined based on an activity history of a player who owns the portable device.

15. The apparatus as recited in claim 12, wherein the server is further configured to award a prize associated with the winning sections.

16. The apparatus as recited in claim 15, wherein the server is further configured such that the prize is awarded via a coupon displayed on the portable device.

17. The apparatus as recited in claim 16, wherein the server is further configured such that the coupon comprises a barcode or QR code, the coupon offers a free or discounted product or service at a particular location, and the barcode or QR code is scanned at the location to verify the coupon's authenticity.

18. The apparatus as recited in claim 12, wherein the server is further configured to store that the code was scanned so that the code cannot initiate another determination of the winning section for a period of time.

19. The apparatus as recited in claim 12, wherein the server is further configured such that the winning sections is not determined randomly but is predetermined by a remote server.

20. A method to provide a game, the method comprising:
   executing on a processing unit instructions to perform:
   determining a location of a player;
   determining a plurality of sections, each sections comprising a prize, at least one of the sections determined using the location of the player;
   forming and displaying a shape comprising the plurality of sections;
   determining a winning section on the shape; and
   awarding a prize associated with the winning section.

* * * * *